(12) United States Patent
Specht

(10) Patent No.: US 11,611,268 B2
(45) Date of Patent: Mar. 21, 2023

(54) STATOR DEVICE, ELECTRIC FLAT MOTOR AND METHOD FOR PRODUCING A STATOR DEVICE

(71) Applicant: HS PRODUCTS ENGINEERING GMBH, Maisach (DE)

(72) Inventor: Martin Specht, Feldafing (DE)

(73) Assignee: HS PRODUCTS ENGINEERING GMBH, Maisach (DE)

( * ) Notice: Subject to any disclaimer, the term of this patent is extended or adjusted under 35 U.S.C. 154(b) by 0 days.

(21) Appl. No.: 17/254,269

(22) PCT Filed: Jun. 5, 2019

(86) PCT No.: PCT/EP2019/064725
§ 371 (c)(1),
(2) Date: Dec. 19, 2020

(87) PCT Pub. No.: WO2019/243060
PCT Pub. Date: Dec. 26, 2019

(65) Prior Publication Data
US 2021/0273535 A1 Sep. 2, 2021

(30) Foreign Application Priority Data

Jun. 22, 2018 (DE) ...................... 10 2018 210 163.9

(51) Int. Cl.
*H02K 15/02* (2006.01)
*H02K 11/21* (2016.01)
(Continued)

(52) U.S. Cl.
CPC ............. *H02K 15/02* (2013.01); *H02K 1/182* (2013.01); *H02K 3/26* (2013.01); *H02K 5/18* (2013.01);
(Continued)

(58) Field of Classification Search
CPC ........... H02K 1/24; H02K 15/02; H02K 11/21
(Continued)

(56) References Cited

U.S. PATENT DOCUMENTS 5,644,183 A * 7/1997 Van Loenen .......... H02K 21/24
310/DIG. 6
2008/0079329 A1* 4/2008 Horng ...................... H02K 3/47
310/86
(Continued)

FOREIGN PATENT DOCUMENTS

DE 102005023493 A1 11/2006
DE 10 2015 209 322 A1 11/2016
(Continued)

OTHER PUBLICATIONS

German Examination Report for corresponding DE Application No. 10 2018 210 163.9, dated May 7, 2021, 7 pages, with translation summary.
(Continued)

*Primary Examiner* — Jose A Gonzalez Quinones
(74) *Attorney, Agent, or Firm* — Vorys, Sater, Seymour and Pease LLP; Anthony P. Venturino; Maryellen Feehery Hank

(57) ABSTRACT

Provided is a stator device for an electric flat motor, including a first stator side part and a second stator side part which can be arranged in such a way that a gap is formed between the first stator side part and the second stator side part to accommodate a rotor, the first stator side part includes an electrically insulating carrier substrate with an electrically conductive conductor layer arranged thereon, and wherein coil-like conductor tracks are formed in the conductor layer. The stator device includes a stiffening device for stiffening the first stator side part, wherein the stiffening device is designed as a magnetic inference for the first stator side part. Furthermore, provided is an electric flat motor for a quick adjustment device for a motor vehicle and a method for producing a stator device for an electric flat motor.

18 Claims, 7 Drawing Sheets

(51) Int. Cl.
*H02K 1/18* (2006.01)
*H02K 3/26* (2006.01)
*H02K 5/18* (2006.01)

(52) U.S. Cl.
CPC ......... *H02K 11/21* (2016.01); *H02K 2213/03* (2013.01)

(58) Field of Classification Search
USPC .......................................... 310/52, 266–268
See application file for complete search history.

(56) References Cited

U.S. PATENT DOCUMENTS

2008/0277094 A1  11/2008  Peng et al.
2011/0291511 A1  12/2011  Crocker
2017/0353072 A1  12/2017  McSheery

FOREIGN PATENT DOCUMENTS

| DE | 102015209322 A1 | * | 11/2016 | |
|---|---|---|---|---|
| EP | 1 022 201 A1 | | 7/2000 | |
| EP | 1022201 A1 | * | 7/2000 | ......... B60R 22/3413 |
| JP | 59-122349 A | | 7/1984 | |
| JP | 59122349 A | * | 7/1984 | ............. H02K 29/03 |
| JP | 59-178952 A | | 10/1984 | |
| JP | 2018-93650 A | | 6/2018 | |
| JP | 2018093650 A | * | 6/2018 | |
| TW | 201328128 A | * | 7/2013 | |
| TW | 201328128 A1 | | 7/2013 | |

OTHER PUBLICATIONS

Office Action issued in corresponding DE Application No. 10 2018 210 163.9, with translation, 12 pages, dated Jan. 24, 2019.

* cited by examiner

STATOR DEVICE, ELECTRIC FLAT MOTOR AND METHOD FOR PRODUCING A STATOR DEVICE

FIELD OF THE INVENTION

The present invention relates to a stator device for an electric flat motor, in particular for a quick adjustment, e.g. for a belt tensioning device or a seat adjuster of a motor vehicle. Furthermore, the invention relates to an electric flat motor with a generic stator device as well as a method for producing a generic stator device for an electric flat motor.

BACKGROUND OF THE INVENTION

Due to a continuously growing traffic density and the associated increased risk of accidents, an essential aspect in the development of motor vehicles is the security of the vehicle occupants. A distinction is made between accident-preventing and accident-reducing security systems. Accident-preventing security systems have the task of detecting potentially dangerous driving situations and, if necessary, initiating measures to prevent an accident. Within this framework, a further distinction is made between actively intervening systems and warning systems. For example, actively intervening systems can influence the wheel torque, the steering angle or the vehicle tilt. In this way, for example, a wheel block can be prevented, a braking process can be initiated or an evasive maneuver can be carried out, while taking into account the vehicle's center of gravity. For this purpose, the shock absorbers are provided with a quick adjustment, for example. Warning systems usually indicate the presence of a dangerous situation visually, acoustically or haptically, for example by means of warning lights, warning tones, vibrations or similar. Often, actively intervening security systems are coupled with warning systems so that an automatic intervention of an actively intervening security system is confirmed by means of a warning system.

Accident-reducing security systems, on the other hand, have the task of reducing the effects of a dangerous driving situation or an accident on the motor vehicle's occupants, the motor vehicle's environment or the motor vehicle itself. To protect occupants, for example, a body design, chassis components, airbags, security glass, vehicle seats or security belts are known as accident-reducing security systems. Security belts and vehicle seats have the task of holding an occupant of the motor vehicle in position in the event of severe deceleration, such as emergency braking, impact with an obstacle or the like, in order to prevent or at least reduce injuries to the occupant. In order to improve this task, modern security systems comprise so-called quick adjustment devices, such as belt tensioners, seat position adjusters, shock absorber adjusters, steering angle adjusters, which in a dangerous situation, in particular during and immediately before a collision or during emergency braking, remove loose parts from the security system in order to allow the occupant to participate in the vehicle deceleration better or earlier. A critical driving situation can be detected e.g. by means of an appropriately designed sensor system. Sensor data from the sensor system can be evaluated via a control device or a triggering device in order to trigger the quick adjustment devices if necessary. Alternatively, the sensor system and the triggering device can be designed as a purely mechanical structural unit.

Known quick adjustment devices in belt tensioners or seat elements, such as seat ramps or headrests, for example, comprise an explosive charge that can be ignited in a critical driving situation and tightens the security belt or moves a seat element into another position. Such quick adjustment devices have the disadvantage that the charge is used up after ignition and the explosive charge must be reloaded in a workshop. If, for example, an accident occurs between tensioning the security belt and reloading the belt tensioner, the belt tensioner is out of action. The same applies, of course, to the quick seat adjustment devices. The affected occupant of the motor vehicle is then no longer optimally protected. An alternative design, e.g. a belt tensioner, comprises an electric motor instead of the explosive charge, which can be activated in a critical driving situation and tightens the security belt. The same is also possible on the seat component adjusters such as the headrest or ramp. Such electric motors can usually handle quick adjustments at time intervals without any problems. Nevertheless, such electric motors usually have to be equipped with a gear and usually require a relatively large installation space and a high dead weight in order to provide sufficient power for a quick adjustment process. This is a particular disadvantage when the installation space is very limited. Furthermore, the energy consumption of a motor vehicle increases with its weight, so that such electric motors cause a higher energy consumption of the motor vehicle.

Electric flat motors can therefore be used to reduce the weight of quick adjustment devices, such as belt tensioners. In an electric flat motor, a rotor is rotatably mounted between two plate-shaped stator halves. Such electric flat motors with lateral so-called air coils require less installation space than conventional electric motors. However, conventional electric flat motors have the disadvantage that a maximum torque is relatively low. In addition, electric flat motors tend to burn out under high loads, since they are controlled with relatively high currents to generate a high torque. This is in particular true if the electric flat motors are under regular high load. Finally, when electric flat motors are subjected to high loads, one stator half may bend due to the strong magnetic field. In extreme cases, the stator half and the rotor can even touch each other, thus decelerating the rotor and thus damaging or destroying the electric flat motor.

JP-59122349-A discloses an arranging method of armature coil for a disk type brushless motor.

JP-2018093650-A discloses a laminated coil formed by laminating a wiring board having a wiring pattern serving as motor coil, a stator using the laminated coil, and a motor provided with the stator coil.

DE 10 2015 209 322 A1 discloses a linear motor.

TW 201328128A discloses a motor structure with a folding stator.

EP 1 022 201 A1 discloses a seat belt retractor.

SUMMARY OF THE INVENTION

It is therefore an object of the present invention to remedy or at least partially remedy the disadvantages described above in the case of a stator device for an electric flat motor, an electric flat motor for a quick adjustment device, such as a belt tensioning device, for a motor vehicle, and a method for producing a stator device for an electric flat motor. In particular, it is an object of the present invention to create a stator device, an electric flat motor and a method for producing a stator device for an electric flat motor, which in a simple and inexpensive manner promote a high operational security of an electric flat motor and prevent damage.

The preceding object is solved by the patent claims. Accordingly, the object is solved by a stator device for an electric flat motor with the features of the independent claim 1, by an electric flat motor for a quick adjustment device, such as a belt tensioning device, for a motor vehicle with the features of the secondary claim 14, and by a method for producing a stator device for an electric flat motor with the features of the secondary claim 15. Further features and details of the invention result from the dependent claims, the description and the figures. Features and details that are described in connection with the stator device according to the invention are of course also valid in connection with the electric flat motor according to the invention and the method according to the invention and vice versa, so that with regard to the disclosure of the individual aspects of the invention reference is or can always be made to each other.

BRIEF DESCRIPTION OF THE DRAWINGS

The figures show schematically.

DETAILED DESCRIPTION

Figure 1:
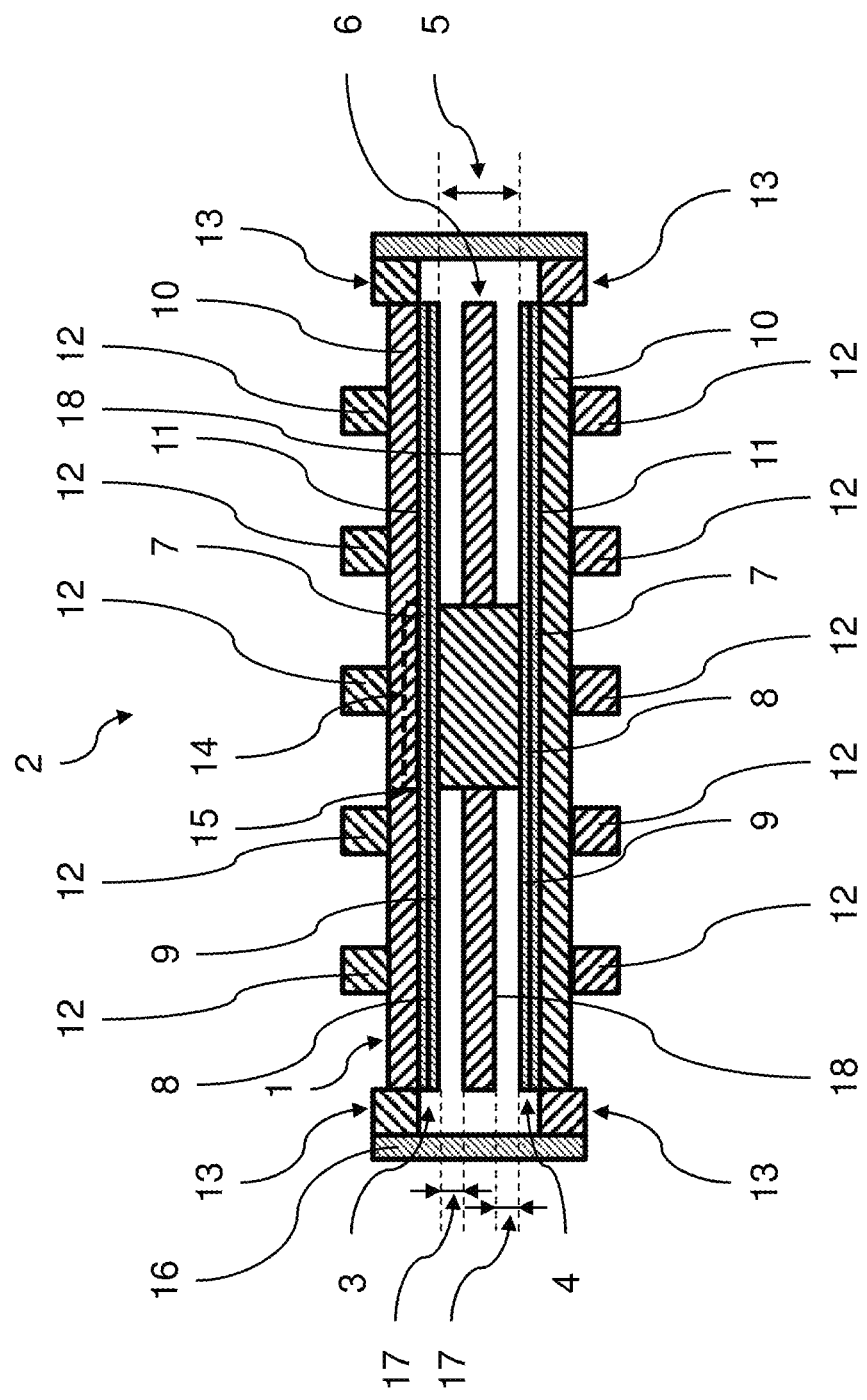
FIG. 1 a sectional view of a preferred embodiment of an electric flat motor according to the invention,
FIG. 2 a top view of a preferred embodiment of a stator device according to the invention,
FIG. 3 a sectional view of a preferred first embodiment of a first stator side part of a stator device according to the invention,
FIG. 4 a sectional view of a preferred second embodiment of a first stator side part of a stator device according to the invention,
FIG. 5 a perspective view of another preferred embodiment of an electric flat motor according to the invention,
FIG. 6 a perspective view of a part of a stator device according to the invention, and
FIG. 7 a flow chart of a preferred embodiment of a method according to the invention.

According to a first aspect of the invention, the object is solved by a stator device for an electric flat motor. The stator device comprises a first stator side part and a second stator side part which can be arranged opposite the first stator side part, wherein the second stator side part can be arranged with respect to the first stator side part in such a way that a gap is formed between the first stator side part and the second stator side part to accommodate a rotor. At least the first stator side part comprises an electrically insulating carrier substrate with an electrically conductive conductor layer arranged thereon. The conductor layer can be designed as a cover layer. Preferably, the conductor layer is arranged between the carrier substrate and an insulator layer. Coil-like conductor tracks are formed in the conductor layer. According to the invention, the stator device comprises a stiffening device for stiffening the first stator side part, wherein the stiffening device is also designed as a magnetic inference for the first stator side part, wherein the first stator side part and the second stator side part are connected to one another via at least one folding section.

The first stator side part and the second stator side part of the stator device can be arranged relative to each other or can be arranged in such a way that a gap is formed between the first stator side part and the second stator side part. The gap is preferably formed uniformly with a constant gap width so that a distance between the first stator side part and the second stator side part is constant or at least constant in an effective region of the first stator side part and the second stator side part. The gap comprises such a gap width that a rotor designed for the stator device can be arranged between the first stator side part and the second stator side part. The rotor can be arranged within the gap in such a way that an air gap between the rotor and the first stator side part and/or the second stator side part is between $1/10$ mm and $5/10$ mm, in particular $3/10$ mm. A surface of the first stator side part that can face or faces the second stator side part is therefore preferably flat or even. A surface of the second stator side part that can face or faces the first stator side part is also preferably flat or even, so that the gap is uniform or at least uniform in an effective region of the stator device. This has the advantage that the air gap between the rotor and the first stator side part or the second stator side part is also uniform if the rotor is designed accordingly.

The first stator side comprises the electrically insulating carrier substrate. The carrier substrate can consist of one layer or comprise several layers, which are preferably connected to each other. The carrier substrate is preferably flexible. The conductive conductor layer is arranged on the carrier substrate. The conductor layer is preferably flexible. Preferably, the first stator side part is flexible or at least bendable. Thus, the first stator side part is preferably designed according to a flexible board.

The conductor layer is designed in such a way that it comprises coil-like conductor tracks, wherein this conductor layer can be applied to the carrier substrate on one side or both sides. In this way, the conductor layer provides a magnetic coil or at least part of a magnetic coil. The excitation field of the electric flat motor for driving the rotor can thus be generated by means of the conductor tracks. The coil-like conductor tracks are produced by etching the conductor layer, for example. Alternatively, the coil-like conductor tracks can be produced by an additive manufacturing method. Preferably, the conductor layer comprises copper or is made of copper or at least essentially of copper. For the formation of the magnetic coils, other embodiments are conceivable. For example, grid structures can be applied to an appropriate carrier material. These grid structures can be made of different conductive materials, preferably Cu, iron, steel, and aluminium. The structures can be produced, for example, by water jet cutting, laser cutting, punching or any other cutting method.

There are also other conductive materials conceivable that can be used as conductor tracks and coils, conceivable are ferrous materials or aluminium in its various alloys. The first stator side part comprises a large cross-section in relation to its thickness. Preferably, the second stator side part also comprises a large cross-section in relation to its thickness. Preferably, the conductor layer is facing away from the stiffening device and the carrier substrate is facing the stiffening device. The carrier substrate can, for example, contact the stiffening device.

The stiffening device is designed to stiffen the first stator side part and comprises a magnetically conductive material, in particular iron, sheet metal, e.g. ST12 or similar, or is formed from such a material. A sandwich system is also conceivable, such as a combination of easily formable steel and a soft magnetic powder composite (SMC=soft metal composite). Preferably, the stiffening device is plate-shaped or disc-shaped. The stiffening device is also preferably adapted to or at least essentially corresponds to the outer contour of the first stator side part. It may be provided that the stiffening device comprises a central recess for the passage of a part of the rotor, in particular a rotor axis. The stiffening device is thus designed as a magnetic inference for the first stator side part. Therefore, it is preferred that the stiffening device is arranged on a side of the first stator side part that is facing away from the second stator side part. The stiffening device is preferably connected to the first stator side part or held on it in such a way that bending of the first stator side part can be prevented by the stiffening device. The first stator side part is thus protected against bending, arching or shielding.

A stator device according to the invention for an electric flat motor has the advantage over conventional stator devices that the stability of the stator device, in particular of the first stator side part, is increased by the stiffening device by simple means and in a cost-effective manner. A thickness of the stator device is only slightly increased by this, so that an electric flat motor with a stator device according to the invention comprises a small installation space. In addition, the stiffening device has the further effect that the excitation field in the gap is improved. The efficiency of the electric flat motor can thus be improved. In addition, the load on the conductor tracks during operation of the electric flat motor can be reduced, so that the stator device comprises an improved design life.

In accordance with a preferred development of the invention, a stator device may provide that a surface of the first stator side part that can face the second stator side part comprises a flatness tolerance of $1/10$ mm or less. According to the invention, it is preferred if the surface comprises this flatness tolerance in combination with the stiffening device. The surface faces the gap or air gap between the first stator side part and the second stator side part when the stator device is in operational condition. In the context of the invention, the flatness tolerance means that the surface is flat and deviations from an ideal flat surface are allowed within the flatness tolerance, i.e. of a maximum of $1/10$ mm. A flatness tolerance may be necessary in particular due to manufacturing limitations, such as machine accuracy, material properties or the like. With such a flatness tolerance, a particularly advantageous air gap can be realized by simple means and at low cost.

According to the invention, it is preferred that a conductor layer is arranged on both sides of the carrier substrate. Preferably, both conductor layers comprise coil-like conductor tracks. In this preferred embodiment, it is further preferred that an additional electric insulation, e.g. a foil, a lacquer layer or the like, is arranged between the conductor layer and the stiffening device in order to avoid a short circuit of the conductor tracks through the stiffening device. Such a first stator side part has the advantage that the power of the electric flat motor can be improved by simple means and in a cost-effective way.

Preferably, the first stator side part comprises several carrier substrates each having at least one conductor layer, wherein the carrier substrates are arranged one above the other. The carrier substrates are therefore stacked one above the other, wherein preferably a first conductor layer arranged on a first carrier substrate touches an adjacent second carrier substrate. Alternatively, it may be provided that the first conductor layer arranged on the first carrier substrate touches a second conductor layer arranged on the adjacent second carrier substrate. In this case, the first conductor layer and the second conductor layer are preferably designed in such a way that they form one or more common conductor tracks. In this case, it is intended to form the coil arrangement of the second carrier substrate with the conductor layer mirror-inverted to the first carrier substrate with a coil-conductor layer on both sides. Alternatively, an electric insulation, such as a foil, a lacquer layer or similar, can be arranged between directly adjacent conductor layers. Preferably, at least one carrier substrate comprises a conductor layer on both sides. Preferably, another carrier substrate comprises a conductor layer on one side only. Such a first stator side part has the advantage that the power of the electric flat motor can be improved by simple means and at low cost.

In a particularly preferred embodiment of the invention, it may be provided in the case of a stator device that the stiffening device is fixed to the first stator side part by means of an, in particular electrically insulating, adhesive layer. By means of the adhesive layer, a molecular bond between the stiffening device and the first stator side part can be achieved. Preferably, the adhesive layer comprises such a heat resistance that it ensures that the stiffening device is fixed to the first stator side part at the intended operating temperature and storage temperature of the electric flat motor. By means of an adhesive layer, the stiffening device and the first stator side part can be connected to each other by simple means and at low cost and preferably permanently, so that a bending of the first stator side part away from the stiffening device during operation of the electric flat motor can be avoided.

Preferably the stiffening device comprises at least one cooling fin facing away from the first stator side part. The stiffening device preferably comprises several such cooling fins, which are distributed in particular evenly over the stiffening device. The cooling fins are preferably non-magnetizable so that an interaction between the excitation field and the cooling fins is avoided. Alternatively, the cooling fins can be magnetizable. In this case, it is preferable if the cooling fins are designed and arranged in such a way that they further enhance the effect of the stator inference. Cooling fins have the advantage that the risk of overheating of the first stator side part can be reduced. Heat can therefore be dissipated from the first stator side part via the stiffening device and the cooling fins by simple means and in a cost-effective manner.

According to a preferred embodiment of the invention, the carrier substrate and/or stiffening device comprises a prepreg. A prepreg is a textile fiber-matrix component comprising reinforcing fibers embedded in a matrix material, in particular a resin. In the stiffening device, magnetically conductive elements may be embedded in or laminated to the prepreg. A prepreg has the advantage with a structural component that depending on the selected matrix material a concrete flexibility or stiffness of the structural component can be achieved. In addition, prepregs can be processed by simple means, in particular they can be molded, and are available at low cost. Furthermore, a prepreg comprises a relatively low density and is therefore particularly suitable for reducing the weight of the electric flat motor. Finally, prepregs can be cured in an advantageous way so that a good form stability can be guaranteed even under high mechanical loads.

Particularly preferably, the second stator side part comprises an electrically insulating carrier substrate with an electrically conductive conductor layer arranged thereon, wherein coil-like conductor tracks are formed in the conductor layer. The stator device also comprises a stiffening device for stiffening the second stator side part, wherein the stiffening device is designed as a magnetic inference for the second stator side part. It is preferred that the second stator side part is designed to be flexible. It is particularly preferred that the second stator side part has the same properties as described above for the first stator side part. According to the invention, it is preferred that the first stator side part and the second stator side part are the same or at least essentially the same. Also preferably, the stiffening device arranged on the first stator side part corresponds at least substantially to the stiffening device arranged on the second stator side part. A stator device designed in this way has the advantage that the total thickness of the electric flat motor can be reduced by simple means and in a cost-effective manner with the same or improved power.

The stiffening devices preferably each comprise at least one fixing connection for connecting the stiffening devices. By means of the fixing connection, the stiffening device arranged on the first stator side part can be connected to the stiffening device arranged on the second stator side part so that the relative position of the first stator side part and the second stator side part is fixed. Preferably, the stiffening devices each comprise at least two, in particular preferably three or four, fixing connections, which are spaced as far apart as possible so that the relative positional fixation of the first stator side part and the second stator side part is ensured. Such fixing connections have the advantage that the relative position of the first stator side part and the second stator side part can be fixed with simple means and in a cost-effective way. A defined gap between the first stator side part and the second stator side part can thus be guaranteed.

Preferably, the stiffening device comprises a receiving section for arranging a bearing or a raceway for rolling elements or bearing shells for the rotatable bearing of the rotor of the electric flat motor. If several stiffening devices are used, it may be provided according to the invention that the stiffening devices each comprise such a receiving section or such a raceway. It may also be provided that a stiffening device comprises several, in particular two, receiving sections or several, in particular two, raceways. A receiving section is preferably designed according to a central recess of a hollow cylinder. A raceway preferably comprises a concave cross-section to prevent the rolling elements from being dissipated. In addition, lateral boundaries may be provided on a receiving section and/or a raceway to prevent lateral slippage of the bearing or rolling elements. According to the invention, the bearing can be designed in particular as a rolling bearing, such as a ball bearing, a roller bearing, a barrel bearing, a needle bearing or similar. Preferably, the bearing is designed as a precision bearing. The rolling element is preferably designed as a ball, a cylinder, a barrel, a needle or similar. Alternatively, a plain bearing can also be used as bearing. Such a stiffening device has the advantage that a bearing of the rotor on the stator device can be achieved with simple means and in a cost-effective way. Due to the high strength of the stiffening device, an unintentional relative pivoting and linear movement of the rotor to the stator device can be prevented by simple and cost-effective means.

It is preferred that the first stator side part and the second stator side part comprise a common carrier substrate. The carrier substrate is preferably in the region of the first stator side part similar or exactly the same as in the region of the second stator side part. The conductor layer is preferably in the region of the first stator side part similar or exactly the same as in the region of the second stator side part. For the relative arrangement of the first stator side part and the second stator side part with the formation of a constant gap, the carrier substrate preferably comprises a bent region. The carrier substrate is preferably folded or bent through 180° in the bent region. A common carrier substrate has the advantage that the production of the first stator side part and the second stator side part is simplified with simple means and in a cost-effective way.

According to a preferred further development of the invention, it may be provided in a stator device that a sensor device for determining a rotational speed and/or a rotational angle position of the rotor is arranged on the first stator side part and/or the second stator side part. The sensor device preferably comprises a sensor for recognizing marks arranged on the rotor. This sensor can be inductive, capacitive, magnetic or optical. The sensor device is preferably arranged in the region of a bearing seat of the first stator side part or the second stator side part. Alternatively, the sensor device can also be arranged on the circumference of the rotor disk. By means of a sensor device, an angular position and/or a rotational speed of the rotor relative to the stator device can be determined in an advantageous way by simple means and in a cost-effective way.

The first stator side panel and the second stator side panel are connected to one another via a folding section. Preferably, the first stator side part and the second stator side part comprise a folding section. It is also conceivable that an electrically conductive connection between the first and second stator side parts is established by the folding section. It is therefore conceivable that the electronic components could be divided between the first and second stator side parts. In this way, for example, power regions can be spatially separated from the control regions of the motor electronic system. A folding section comprises a bend or fold and can be produced with simple means and in a cost-effective manner. Furthermore, a folding section is well suited for connecting the first stator side part with the second stator side part, for example, via a connecting shaft that can be held by the folding section. Finally, a folding section can be used to determine a relative position of the first stator side part to the second stator side part, making it easier to align the first stator side part with the second stator side part.

According to a second aspect of the invention, the object is solved by an electric flat motor for a quick adjustment device, such as a belt tensioning device, for a motor vehicle. The electric flat motor comprises a stator device and a rotor rotatable by means of the stator device. The stator device is designed as a stator device in accordance with the invention. The rotor preferably comprises permanent magnets so that the rotor can be set in rotation by means of a magnetic excitation field generated by the stator device.

The electric flat motor described above has all the advantages already described for a stator device according to the first aspect of the invention. According to this, the electric flat motor according to the invention has the advantage over conventional electric flat motors that the stability of the stator device, in particular of the first stator side part, is increased by the stiffening device by simple means and in a cost-effective manner. A thickness of the stator device is thereby only slightly increased, so that the electric flat motor with the stator device according to invention comprises a small installation space. In addition, the stiffening device has the further effect that the excitation field in the gap is improved. The efficiency of the electric flat motor is thus improved. In addition, the load on the conductor tracks during operation of the electric flat motor can be reduced, so that the electric flat motor comprises an improved design life.

According to a third aspect of the invention, the object is solved by a method of producing a stator device for an electric flat motor. The method comprises the following steps:

providing a first stator side part and a second stator side part, wherein at least the first stator side part comprises an electrically insulating carrier substrate with an electrically conductive conductor layer arranged thereon, wherein coil-like conductor tracks are formed in the conductor layer, providing a stiffening device for stiffening the first stator side part, wherein the stiffening device is designed as a magnetic inference for the first stator side part, connecting the first stator side part to the stiffening device by means of an adhesive layer and/or another connecting technique, and relatively arranging the first stator side part with the second stator side part in such a way that a gap with a constant gap width is formed between the first stator side part and the second stator side part, and that the stiffening device arranged on the first stator side part is facing away from the second stator side part, wherein the relative arrangement of the first stator side part with the second stator side part occurs by folding.

The first stator side part comprises the electrically insulating carrier substrate. The carrier substrate can hereby consist of one layer or comprise several layers, which are preferably connected to each other. The carrier substrate is preferably flexible. The conductive conductor layer is arranged on the carrier substrate. The conductor layer is preferably flexible. Preferably, the first stator side part is flexible or at least bendable. Thus, the first stator side part is preferably designed according to a flexible board. Preferably, the second stator side part is designed according to the first stator side part.

The conductor layer is designed in such a way that it comprises coil-like conductor tracks. In this way, a magnetic coil or at least a part of a magnetic coil is provided by means of the conductor layer. The excitation field of the electric flat motor for driving the rotor can thus be generated by means of the conductor tracks. The coil-like conductor tracks are produced by etching the conductor layer, for example. Alternatively, the coil-like conductor tracks can be produced by an additive manufacturing method. Preferably, the conductor layer comprises copper or is formed of copper or at least essentially formed of copper. Alternatively, other conductive materials are conceivable. The first stator side part comprises a large cross-section in relation to its thickness. Preferably, the second stator side part also comprises a large cross-section in relation to its thickness. Preferably, the conductor layer is facing away from the stiffening device and the carrier substrate faces the stiffening device. The carrier substrate can, for example, contact the stiffening device.

The stiffening device is designed to stiffen the first stator side part and comprises a magnetically conductive material, in particular iron, sheet metal, e.g. ST12 or similar, or is formed from such a material. A sandwich system is also conceivable, such as a combination of easily formable steel and a soft magnetic powder composite (SMC=soft metal composite). Preferably, the stiffening device is plate-shaped or disc-shaped. The stiffening device is also preferably adapted to or at least essentially corresponds to the outer contour of the first stator side part. It may be provided that the stiffening device comprises a central recess for the passage of a part of the rotor, in particular a rotor axis. The stiffening device is thus designed as a magnetic inference for the first stator side part. Therefore, it is preferred that the stiffening device is arranged on a side of the first stator side part that is facing away from the second stator side part. The stiffening device is preferably connected to the first stator side part or held on it in such a way that bending of the first stator side part can be prevented by the stiffening device. The first stator side part is thus protected against bending, arching or shielding.

The first stator side part is connected to the stiffening device by means of an adhesive layer and/or another connecting technique. Preferably, the second stator side part is also connected with an adhesive layer and/or another connecting technique with a stiffening device. An adhesive layer is preferably designed as an electric insulator. By means of the adhesive layer a molecular bond between the stiffening device and the first stator side part can be achieved. Preferably, the adhesive layer comprises such a heat resistance that it ensures that the stiffening device is fixed to the first stator side part at the intended operating temperature of the electric flat motor. The connection also preferably occurs by a pressing process.

The first stator side part and the second stator side part of the stator device are arranged relative to each other in such a way that a gap is formed between the first stator side part and the second stator side part. The gap is formed uniformly with a constant gap width so that a distance between the first stator side part and the second stator side part is constant or at least constant in an effective region of the first stator side part and the second stator side part. The gap comprises such a gap width that a rotor designed for the stator device can be arranged between the first stator side part and the second stator side part. The rotor can be arranged within the gap in such a way that an air gap between the rotor and the first stator side part and/or the second stator side part is between $1/10$ mm and $5/10$ mm, in particular $3/10$ mm. A surface of the first stator side part that can face or faces the second stator side part is therefore preferably flat or even. A surface of the second stator side part that can face or faces the first stator side part is also preferably flat or even, so that the gap is uniform or at least uniform in an effective region of the stator device. This has the advantage that the air gap between the rotor and the first stator side part or the second stator side part is also uniform if the rotor is designed accordingly.

The method according to the invention provides all the advantages already described for a stator device according to the first aspect of the invention and for an electric flat motor according to the second aspect of the invention. Accordingly, a method according to the invention for producing a stator device for an electric flat motor has the advantage over conventional methods that a stator device can be produced by simple means and in a cost-effective manner, whose stability, in particular of the first stator side part, is increased by the stiffening device. A thickness of the stator device is only slightly increased by this, so that an electric flat motor with the stator device according to the invention comprises a small installation space. In addition, the use of the stiffening device has the further effect that the excitation field in the gap is improved. The efficiency of an electric flat motor is thus improved. In addition, the load on the conductor tracks during operation of the electric flat motor can be reduced, so that a stator device produced by means of the method according to the invention has an improved design life.

It may be provided in a method according to the invention that for the relative arrangement a plate-shaped spacer body is arranged between the first stator side part and the second stator side part and removed again after the relative arrangement. The spacer body can, for example, be arranged between the first stator side part and the rotor or between the second stator side part and the rotor. The spacer body preferably comprises such form stability that it is not compressed during a pressing process. In this way, it can be ensured that the gap is formed uniformly with a constant gap width. The contour of the spacer bodies, which can be horseshoe-shaped, is preferably designed in such a way that it takes into account the spring-back of the stator side parts after the caulking or fixing of the stiffening elements.

The relative arrangement of the first stator side part with the second stator side part occurs by folding. Here it is preferred that the first stator side part and the second stator side part comprise a common carrier substrate, which is bent or folded over in such a way that the first stator side part and the second stator side part are arranged relative to each other while forming the constant gap. Alternatively, a common hinge and/or a fold can be provided between the carrier substrates of the first stator side part and the second stator side part. The advantage of folding is that it makes it easier to produce the stator device. Furthermore, the folding board has the advantage that the electronic components for controlling and regulating the machine are arranged on it and that the plug connection is also provided. Thus, in one section of the board, the conductor tracks and receptacles for the electronic components and the two coil arrangements are produced on the substrate. The so-called placement of the electronic components on the board by the automatic placement machine is accompanied by the application of the stiffening elements, so it preferably takes place in one working process.

Preferably, a calibration is performed, wherein during calibration a flatness of the first stator side part and/or a parallelism between the first stator side part and the second stator side part is calibrated. By means of calibration, a stator device with a particularly high dimensional accuracy can be produced. In this way, an air gap between the rotor and the first stator side part or the second stator side part can be minimized, so that the installation space required for the electric flat motor can be reduced.

Preferably, the stiffening device is provided as a sandwich component, wherein the sandwich component comprises a ferrous press substrate. Such a press substrate for providing a sandwich component comprises a high stiffness and provides a favorable electric inference.

It is preferable that the conductor tracks and receiving positions, in particular receiving positions, in particular receiving openings, for receiving the electronic components are produced simultaneously with the coil arrangements on a board in a common method step. Preferably, the conductor tracks and/or receiving positions and/or the coil arrangements are produced on both sides of the board. In this way, producing processes can be accelerated and producing costs can be reduced.

Figure 2:
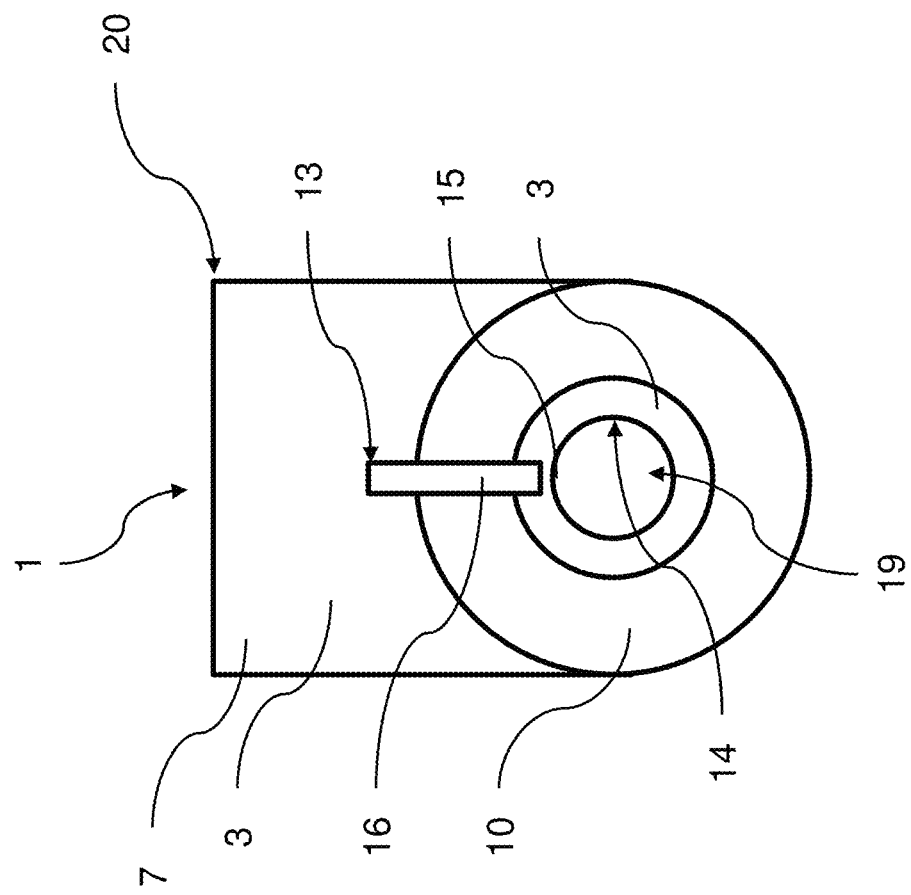
Figure 3:
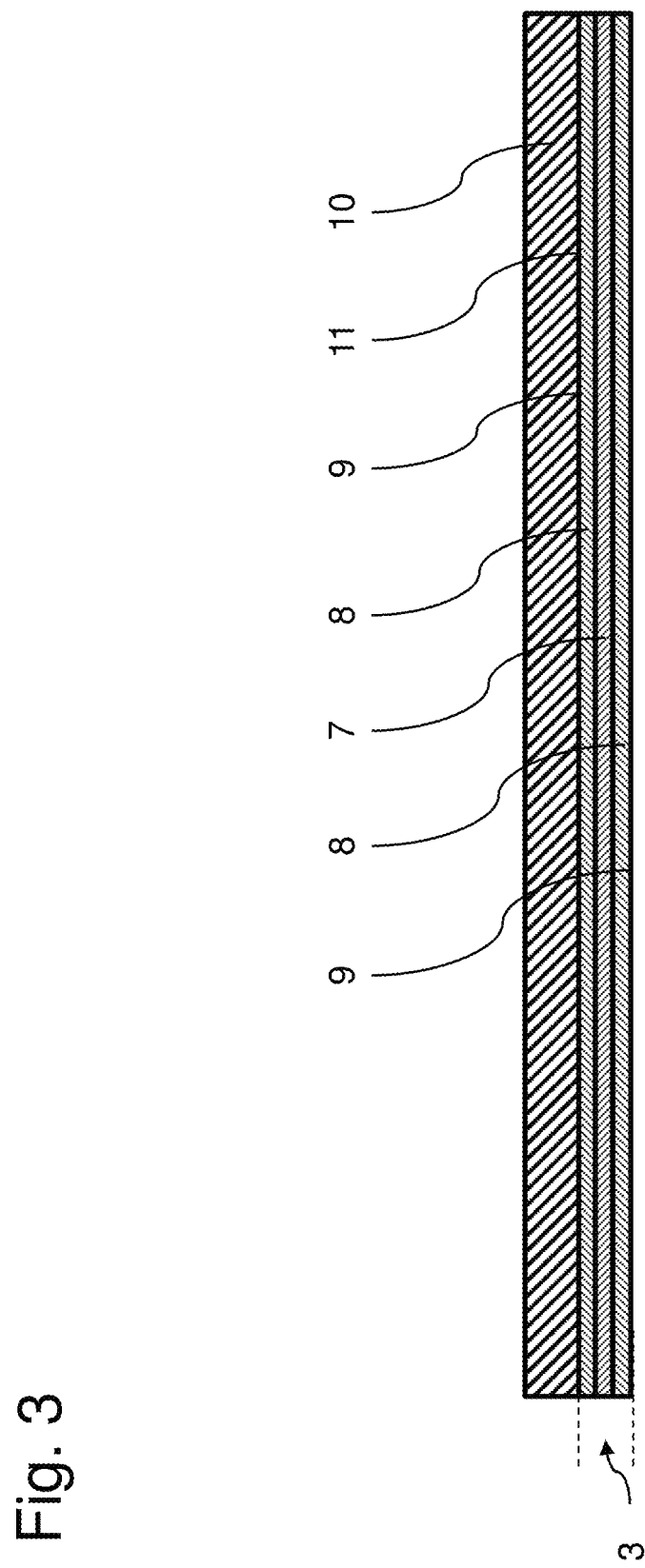
Figure 4:
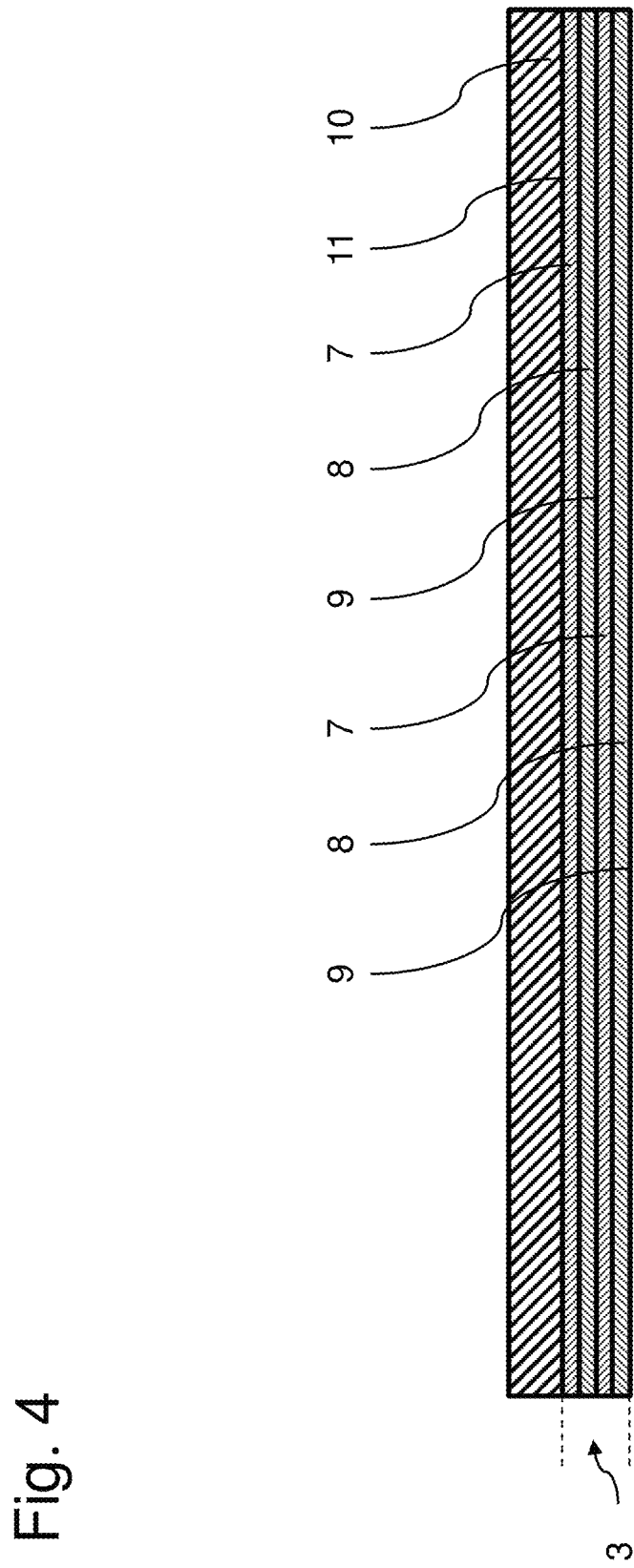
Figure 5:
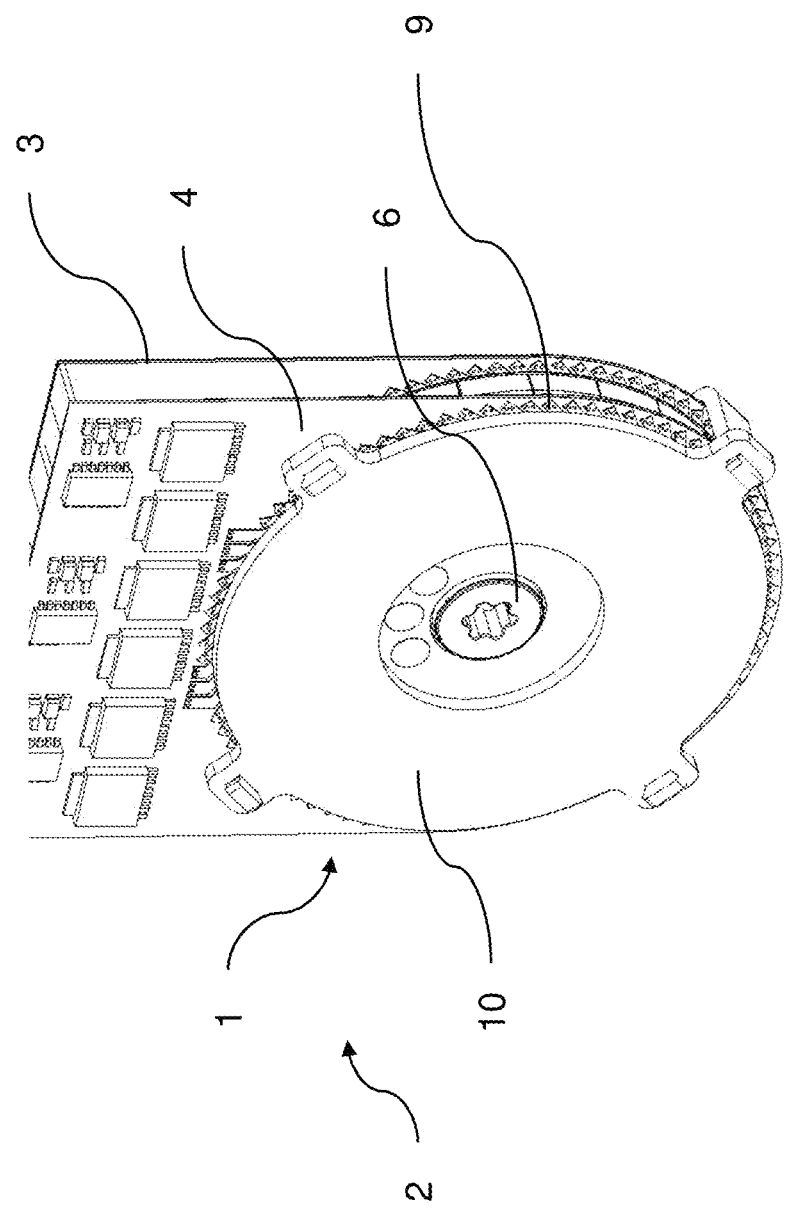
Figure 6:
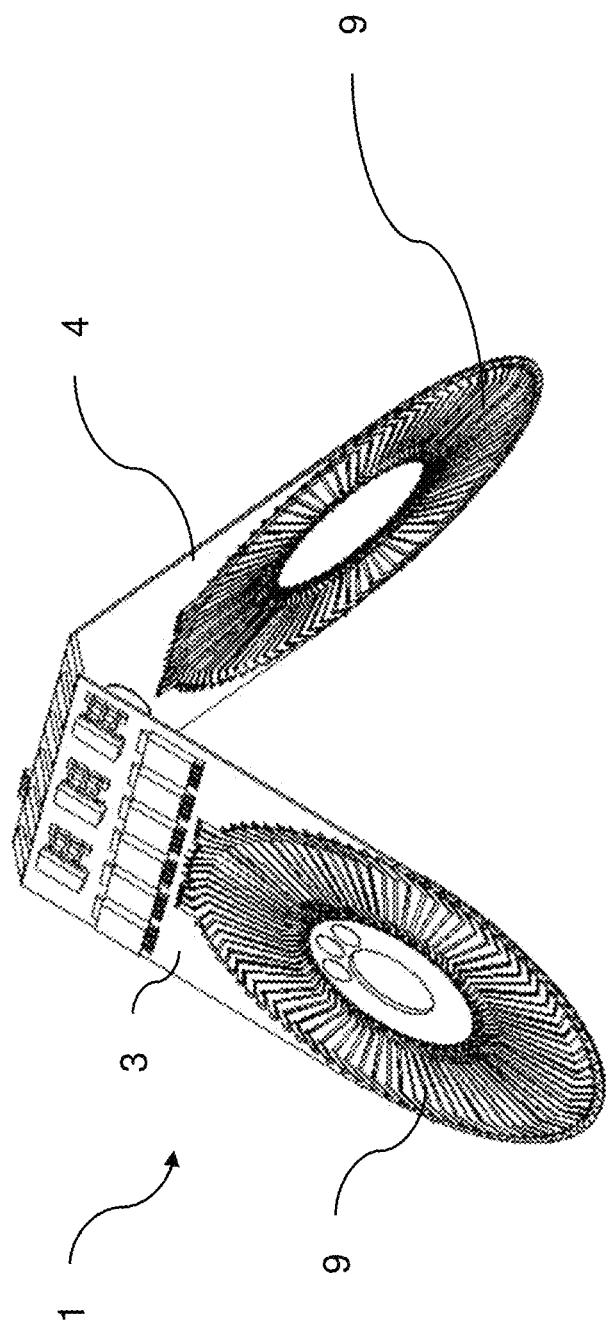
Figure 7:
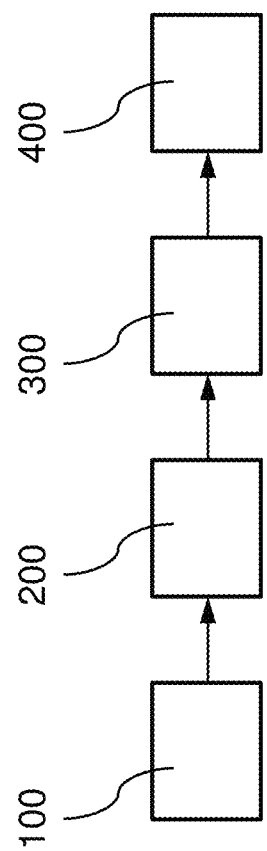

A stator device according to the invention for an electric flat motor, an electric flat motor according to the invention for a quick adjustment device, such as a belt tensioning device, for a motor vehicle as well as a method according to the invention for producing a stator device for an electric flat motor are explained in more detail below on the basis of the figures. The figures show schematically:

FIG. 1 a sectional view of a preferred embodiment of an electric flat motor according to the invention, FIG. 2 a top view of a preferred embodiment of a stator device according to the invention, FIG. 3 a sectional view of a preferred first embodiment of a first stator side part of a stator device according to the invention, FIG. 4 a sectional view of a preferred second embodiment of a first stator side part of a stator device according to the invention, FIG. 5 a perspective view of another preferred embodiment of an electric flat motor according to the invention, FIG. 6 a perspective view of a part of a stator device according to the invention, and FIG. 7 a flow chart of a preferred embodiment of a method according to the invention.

Elements with the same function and mode of operation are marked with the same reference signs in FIGS. 1 to 7.

In FIG. 1, a preferred embodiment of an electric flat motor 2 according to the invention is shown schematically in a sectional view. The electric flat motor 2 comprises a stator device 1 and a rotor 6 with permanent magnets 18 rotatably mounted on the stator device 1. The stator device 1 comprises a first stator side part 3 and a second stator side part 4, which are arranged relative to each other to form a constant gap 5. The rotor 6 is arranged between the first stator side part 3 and the second stator side part 4. An air gap 17 is formed between the first stator side part 3 and the rotor 6 as well as between the second stator side part 4 and the rotor 6.

The first stator side part 3 comprises an electrically insulating carrier substrate 7 with an electrically conductive conductor layer 8 facing the second stator side part 4. Coil-like conductor tracks 9 are formed in the conductor layer 8. For stiffening the first stator side part 3, a stiffening device 10 designed as a magnetic inference for the first stator side part 3 is arranged on the carrier substrate 7 of the first stator side part 3 and connected to the carrier substrate 7 of the first stator side part 3 via a preferably electrically insulating adhesive layer 11. On a side facing away from the first stator side part 3, the stiffening device 10 comprises several cooling fins 12, which are preferably non-magnetic.

The second stator side part 4 in this embodiment is designed according to the first stator side part 3. Accordingly, the second stator side part 4 comprises an electrically insulating carrier substrate 7 with an electrically conductive conductor layer 8 facing the first stator side part 3. Coil-like conductor tracks 9 are formed in the conductor layer 8. For stiffening the second stator side part 4, a stiffening device 10 designed as a magnetic inference for the second stator side part 4 is arranged on the carrier substrate 7 of the second stator side part 4 and connected to the carrier substrate 7 of the second stator side part 4 via a preferably electrically insulating adhesive layer 11. On a side facing away from the second stator side part 4, the stiffening device 10 comprises several cooling fins 12, which are preferably non-magnetic. The stiffening devices 10 each comprise two fixing connections 13, wherein the fixing connections 13 of the stiffening device 10 of the first stator side part 3 are each fixed via a fixing means 16 to a fixing connection 13 of the stiffening device 10 of the second stator side part 4. In this way, a relative movement of the first stator side part 3 to the second stator side part 4 can be prevented. In the stiffening device 10 arranged on the first stator side part 3, a receiving section 14 is formed to accommodate a precision bearing for rotatably bearing the rotor 6 relative to the stator device 1. A sensor device 15 for detecting a rotational speed and/or an angular position of the rotor 6 is arranged on the receiving section 14.

In FIG. 2, a preferred embodiment of a stator device 1 according to the invention is shown schematically in a top view. In this view, the first stator side part 3 with the ring-shaped stiffening device 10 fixed to it is visible. The second stator side part 4 (see FIG. 1) with the ring-shaped stiffening device 10 fixed to it is covered. The first stator side part 3 and the second stator side part 4 comprise a central passage 19 for the arrangement of a rotor 6 not shown (see FIG. 1). In the passage 19, a receiving section 14 is designed to accommodate a bearing not shown for rotatably bearing the rotor 6. A sensor device 15 for detecting a rotational speed and/or a rotational angle position of the rotor 6 is arranged in the region of the receiving section 14. The first stator side part 3 and the second stator side part 4 comprise a common carrier substrate 7 which is folded by 180° in a folding section 20 so that the first stator side part 3 is arranged parallel to the second stator side part 4. Furthermore, the first stator side part 3 comprises a fixing connection 13 to which a fixing means 16 designed as a flat strip is fixed, which is also fixed to a fixing connection 13 of the second stator side part 4 not shown and thus fixes a relative position of the first stator side part 3 to the second stator side part 4.

In FIG. 3, a preferred first embodiment of a first stator side part 3 of a stator device 1 according to the invention is shown schematically in a sectional view. The first stator side part 3 comprises an electrically insulating carrier substrate 7 on which a conductor layer 8 is arranged on both sides. Coil-like conductor tracks 9 are formed in each of the conductor layers. For stiffening the first stator side part 3, a stiffening device 10 designed as a magnetic inference for the first stator side part 3 is arranged on a conductor layer 8 of the first stator side part 3 and connected to the conductor layer 8 of the first stator side part 3 via a preferably electrically insulating adhesive layer 11.

In FIG. 4, a preferred second embodiment of a first stator side part 3 of a stator device 1 according to the invention is shown schematically in a sectional view. The first stator side part 3 comprises an electrically insulating carrier substrate 7 on which a conductor layer 8 is arranged. A further carrier substrate 7 with a conductor layer 8 is arranged on the conductor layer 8 in such a way that a carrier substrate 7 is arranged between two conductor layers 8. In each of the conductor layers, coil-like conductor tracks 9 are formed. For stiffening the first stator side part 3, a stiffening device 10 designed as a magnetic inference for the first stator side part 3 is arranged on a carrier substrate 7 of the first stator side part 3 and connected to the carrier substrate 7 of the first stator side part 3 via a preferably electrically insulating adhesive layer 11.

FIG. 5 shows schematically in a perspective view another preferred embodiment of an electric flat motor 2. The electric flat motor 2 comprises the stator device 1 with the first stator side part 3 and the second stator side part 4, on each of which the stiffening device 10, designed as a stator inference, is arranged. In this view, the conductor tracks 9 of the stator device are clearly visible. The first stator side part 3 is fixed in position by caulking on the second stator side part 4. As an alternative to caulking, rivets, screws, or clips are conceivable for a relative fixation of the position.

In FIG. 6, a part of a stator device 1 according to the invention is shown schematically in a perspective view and in a partially unfolded state. In this view, the first stator side part 3 and the second stator side part 4 are shown without the stiffening device 10. On the first stator side part 3 and the second stator side part 4, conductor tracks 9 are formed on both sides. The folding between the first stator side part 3 and the second stator side part 4 is done via their front side. According to the invention, folds over the long sides are also conceivable.

In FIG. 7, a preferred embodiment of a method according to the invention is shown schematically in a flow chart. In a first method step 100 a first stator side part 3 and a second stator side part 4 are provided. At least the first stator side part 3 comprises an electrically insulating carrier substrate 7 with an electrically conductive conductor layer 8 arranged thereon. Preferably, the second stator side part 4 also comprises an electrically insulating carrier substrate 7 with an electrically conductive conductor layer 8 arranged thereon. Coil-like conductor tracks 9 are formed in the conductor layer 8. In a second method step 200, a stiffening device 10 is provided for stiffening the first stator side part 3. The stiffening device 10 is designed as a magnetic inference for the first stator side part 3. Preferably, a further stiffening device 10 is provided for stiffening the second stator side part 4. This stiffening device 10 is designed as magnetic inference for the second stator side part 4. In a third method step 300, the first stator side part 3 is connected to the stiffening device 10 by means of an adhesive layer 11 and preferably pressed. Preferably in the third method step 300, the second stator side part 4 is also connected to the stiffening device 10 by means of an adhesive layer 11 and preferably pressed. In a fourth method step 400, the first stator side part 3 and the second stator side part 4 are arranged relative to each other in such a way that a gap 5 with a constant gap width is formed between the first stator side part 3 and the second stator side part 4. The stiffening device 10 arranged on the first stator side part 3 is thereby facing away from the second stator side part 4. Preferably, the stiffening device 10 arranged on the second stator side part 4 is facing away from the first stator side part 3.

LIST OF REFERENCE SIGNS

1 stator device
2 electric flat motor
3 first stator side part
4 second stator side part
5 slit
6 rotor
7 carrier substrate
8 conductor layer
9 conductor track
10 stiffening device
11 adhesive layer
12 cooling fin
13 fixing connection
14 receiving section
15 sensor device
16 fixing means
17 air gap
18 permanent magnet
19 passage
20 folding section
100 first method step
200 second method step
300 third method step
400 fourth method step

The invention claimed is:

1. A stator device for an electric flat motor, comprising a first stator side part and a second stator side part which can be arranged opposite the first stator side part, wherein the second stator side part can be arranged with respect to the first stator side part in such a way that a gap is formed between the first stator side part and the second stator side part to accommodate a rotor, wherein at least the first stator side part comprises an electrically insulating carrier substrate with an electrically conductive conductor layer arranged thereon, and
   wherein coil-like conductor tracks are formed in the conductor layer,
   wherein the stator device comprises a stiffening device for stiffening the first stator side part, wherein the stiffening device is also designed as a magnetic inference for the first stator side part, wherein the first stator side part and the second stator side part are connected to one another via at least one folding section determining the relative position of the first stator side part to the second stator side part.

2. The stator device according to claim 1, wherein a surface of the first stator side part that can face the second stator side part comprises a flatness tolerance of 1/10 mm or less.

3. The stator device according to claim 1, wherein a conductor layer is arranged on both sides of the carrier substrate.

4. The stator device according to claim 1, wherein the first stator side part comprises several carrier substrates each having at least one conductor layer, wherein the carrier substrates are arranged one above the other.

5. The stator device according to claim 1, wherein the stiffening device is fixed to the first stator side part by means of an adhesive layer.

6. The stator device according to claim 1, wherein the stiffening device comprises at least one cooling fin facing away from the first stator side part.

7. The stator device according to claim 1, wherein at least the carrier substrate or the stiffening device comprises a prepreg.

8. The stator device according to claim 1, wherein the second stator side part comprises an electrically insulating carrier substrate with an electrically conductive conductor layer arranged thereon, wherein coil-like conductor tracks are formed in the conductor layer, wherein the stator device comprises a stiffening device for stiffening the second stator side part, and wherein the stiffening device is designed as a magnetic inference for the second stator side part.

9. The stator device according to claim 8, wherein the stiffening devices each comprise at least one fixing connection for connecting the stiffening devices.

10. The stator device according to claim 1, wherein the stiffening device comprises a receiving section for arranging a bearing or a raceway for rolling elements for the rotatable bearing of the rotor of the electric flat motor.

11. The stator device according to claim 1, wherein the first stator side part and the second stator side part comprise a common carrier substrate.

12. The stator device according to claim 1, wherein a sensor device for determining at least a rotational speed or a rotational angle position of the rotor is arranged on at least the first stator side part or the second stator side part.

13. An electric flat motor for a quick adjustment device for a motor vehicle, comprising a stator device and a rotor rotatable by means of the stator device,
wherein
the stator device is designed as a stator device according to claim 1.

14. A method for producing a stator device for an electric flat motor, comprising the following steps:
providing a first stator side part and a second stator side part, wherein at least the first stator side part comprises an electrically insulating carrier substrate with an electrically conductive conductor layer arranged thereon, wherein coil-like conductor tracks are formed in the conductor layer,
providing a stiffening device for stiffening the first stator side part, wherein the stiffening device is designed as a magnetic inference for the first stator side part,
connecting the first stator side part to the stiffening device by means of at least an adhesive layer or another connecting technique, and
relatively arranging the first stator side part with the second stator side part in such a way that a gap with a constant gap width is formed between the first stator side part and the second stator side part, and that the stiffening device arranged on the first stator side part is facing away from the second stator side part, wherein the relative arrangement of the first stator side part with the second stator side part occurs by folding determining the relative position of the first stator side part to the second stator side part.

15. The method according to claim 14, wherein for the relative arrangement a plate-shaped spacer body is arranged between the first stator side part and the second stator side part and removed again after the relative arrangement.

16. The method according to claim 14, wherein a calibration is performed, wherein during the calibration at least a flatness of the first stator side part or a parallelism between the first stator side part and the second stator side part is calibrated.

17. The method according to claim 14, wherein the stiffening device is provided as a sandwich component, wherein the sandwich component comprises a ferrous press substrate.

18. The method according to claim 14, wherein the conductor tracks and receiving positions of the electronic components are produced simultaneously with the coil arrangements on a board in a common method step.

* * * * *